(12) United States Patent
Colnot

(10) Patent No.: US 7,620,759 B2  
(45) Date of Patent: Nov. 17, 2009

(54) SECURE MEMORY DEVICE FOR SMART CARDS WITH A MODEM INTERFACE

(75) Inventor: Vincent Cedric Colnot, Milpitas, CA (US)

(73) Assignee: OHVA, Inc., Milpitas, CA (US)

( * ) Notice: Subject to any disclaimer, the term of this patent is extended or adjusted under 35 U.S.C. 154(b) by 24 days.

(21) Appl. No.: 10/696,651

(22) Filed: Oct. 30, 2003

(65) Prior Publication Data

US 2004/0093436 A1 May 13, 2004

Related U.S. Application Data

(60) Provisional application No. 60/423,399, filed on Nov. 4, 2002, provisional application No. 60/423,446, filed on Nov. 4, 2002, provisional application No. 60/423,447, filed on Nov. 4, 2002, provisional application No. 60/423,448, filed on Nov. 4, 2002.

(51) Int. Cl.
*G06F 3/00* (2006.01)
*G06F 13/00* (2006.01)

(52) U.S. Cl. ...................... 710/106; 379/90.01

(58) Field of Classification Search .............. 379/90.01, 379/93.08, 93.26, 93.28; 710/106; 445/557
See application file for complete search history.

(56) References Cited

U.S. PATENT DOCUMENTS

| | | | |
|---|---|---|---|
| 5,929,414 A * | 7/1999 | Saitoh | 235/380 |
| 6,607,136 B1 * | 8/2003 | Atsmon et al. | 235/492 |
| 6,687,350 B1 * | 2/2004 | Landry et al. | 379/144.04 |
| 2003/0046554 A1 * | 3/2003 | Leydier et al. | 713/186 |

* cited by examiner

*Primary Examiner*—Tariq R. Hafiz  
*Assistant Examiner*—Scott Sun  
(74) *Attorney, Agent, or Firm*—Donald R. Boys; Central Coast Patent Agency, Inc

(57) ABSTRACT

A secure memory device for a smart card with a modem interface comprising a rewritable memory such as an EEPROM, a processing unit or a microprocessor, an on-chip oscillator, an ISO 7816 interface, a one-wire modem interface, and characterized in that both communication interfaces are bidirectional and share the same I/O terminal. The modem interface is exchanging data with the host in the form of a modulated signal by means of a card reader characterized by the absence of processing means.

1 Claim, 1 Drawing Sheet

| Header | | | | Card Number | | | Random Number | |
|---|---|---|---|---|---|---|---|---|
| S | FFFF FFFF | E | S | 4217 2060 5942 7514 | E | S | 3E46 C910 1B45 FD12 | E |

SECURE MEMORY DEVICE FOR SMART CARDS WITH A MODEM INTERFACE

CROSS REFERENCE TO RELATED APPLICATIONS

This application claims the benefit of the following filing date of the provisional patents Nos. 60/423,399, 60/423,446, 60/423,447, and 60/423,448 filed on Nov. 4, 2002.

TECHNICAL FIELD

The present invention relates to a secure memory device for smart cards, which comprises a bidirectional modem interface.

BACKGROUND OF THE INVENTION

Integrated circuit cards, commonly referred to as smart cards, are widely used in stores to secure electronic payments.

Smart cards have not been adopted by the online market, although they provide the best security to conduct electronic commerce. The main reasons are the high cost of the card reader and the complexity of the system for most people. Not only a card but also a reader must be provided to the millions of potential end-users who comprise this market base.

The object of the present invention is to provide an inexpensive and easy to use smart card system to secure online transactions on the Internet and over the phone. The smart card authenticates the user when managing bank accounts, making payments, or eventually voting online, for example.

SUMMARY OF THE INVENTION

The above object has been achieved by a secure memory device comprising a bidirectional modem interface. The present invention allows using smart cards online with a simple and inexpensive card reader, which is actually a connector without processing means. The secure memory device remains compliant with the ISO 7816 standards and can be used in the existing card readers.

BRIEF DESCRIPTION OF THE DRAWINGS

FIG. 3 is a schematic of the PC reader for Internet applications.

FIG. 5 is a schematic of the acoustic coupler for Internet and telephone applications.

DETAILED DESCRIPTION

Figure 1:
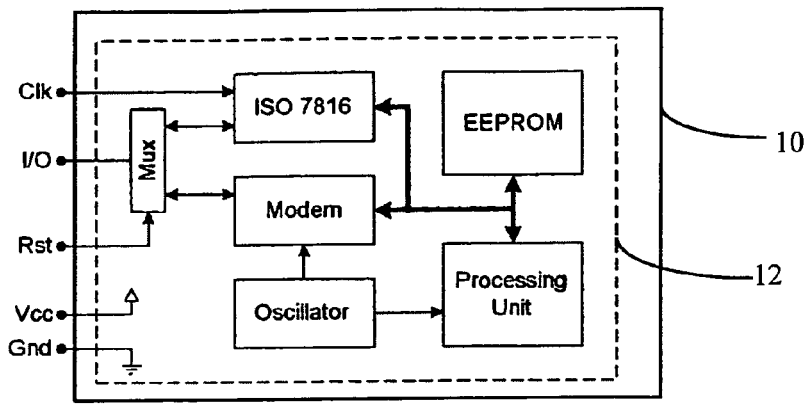
FIG. 1 is a block diagram of the general architecture of a secure memory device according to the present invention.

The secure memory device 12, as detailed in FIG. 1, is installed as part of smartcard 10 and comprises a rewritable memory such as an EEPROM, a processing unit or a microprocessor, an on-chip oscillator, an ISO 7816 interface, and a one-wire modem interface. Both communication interfaces are bidirectional and share the same 110 terminal.

The ISO interface is active when the reset input (Rst) is high. This interface requires an external clock to transmit data to and receive data from a card reader, whatever a synchronous or asynchronous protocol is used.

The modem interface is active when the reset input is low. This is a one-wire interface exchanging data with the host in the form of a modulated signal, and using a connector without processing means as a card reader.

The modem interface carries out the FSK (Frequency Shift Keying) and PSK (Phase Shift Keying) modulations, which are reliable and easy to implement on the host, even though other modulations can be chosen. The data is first encoded using the Manchester or Miller code creating transitions even if the data doesn't change. The modulation and demodulation are controlled by the on-chip oscillator.

When the reset input is pulled down, the device transmits a modulated answer to reset (MAR) to the host. The MAR is transmitted only once, when the card is inserted into the card reader.

Figure 2:
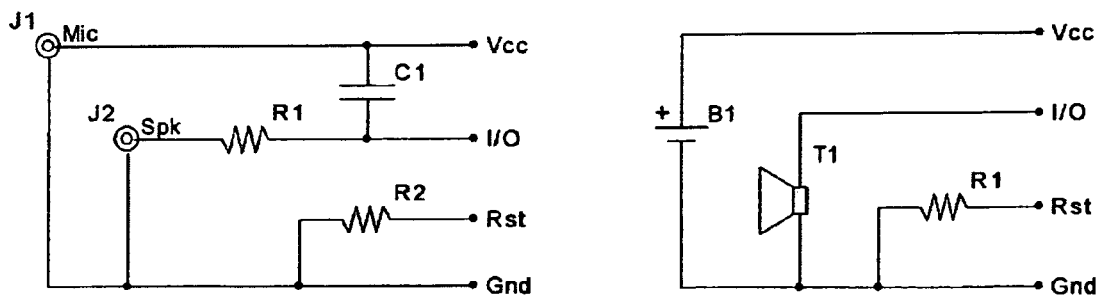
FIG. 2 illustrates the data sequence transmitted by the modem interface.

The MAR, as detailed in FIG. 2, comprises three fields: a header, a card number, and a random number. Each field begins with a start (S) and ends with an error code (E), such as a CRC (Cyclic Redundancy Code), which allows the host to detect a transmission error. In FSK modulation the start has no frequency change, in PSK modulation the start has no phase change.

The 4-byte header determines the beginning of the sequence and allows the host software to adapt the demodulation parameters. The data of the header is typically all one. The 8-byte card number is unique and identifies the card issuer, application version and user account. The 8-byte random number is valid only once.

The fixed number and random number are stored in the EEPROM. When the reset input is pulled down, the device computes a new random number and replaces it in the memory prior to transmit the MAR. Once initiated, the entire process is completed even if the reset input is pulled up. An anti-tearing mechanism ensures that the new random number is properly written in the memory, even if the power source is accidentally or voluntary removed.

In a first embodiment, the modulated data is transmitted to and received from a PC via a card reader, as detailed in FIG. 3, plugged into the microphone input and the speaker output of the PC sound card. A soft-modem applet carries out the modulation and demodulation on the PC side. The modulation frequency is in the range of 0 Hz to 20 kHz being compatible with the sound card capabilities.

The sound cards provides a +3V to +5V DC voltage on the microphone input which is sufficient to power (Vcc) the secure memory device. The capacitor C1 isolates the I/O terminal from the DC voltage and the resistor R1 reduces the signal feedback between the speaker output and the microphone input. The R2 pull down resistor automatically activates the modem interface.

Figure 4:
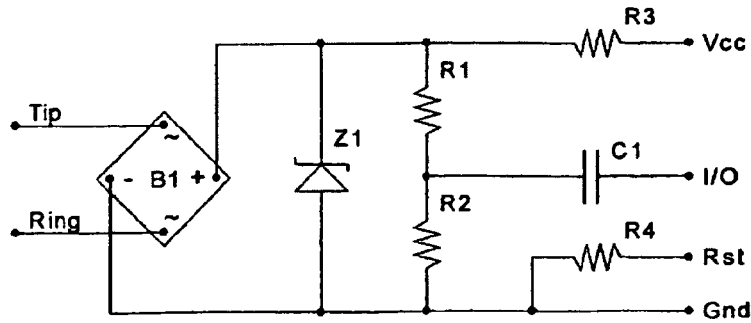
FIG. 4 is a schematic of the phone reader for telephone applications.

In a second embodiment, the modulated data is transmitted to and received from an IVR (Interactive Voice Response) server via a card reader, as detailed in FIG. 4, plugged into telephone line (Tip/Ring). A telephone handset is also plugged on the telephone line to establish the communication with the IVR server. A soft-modem applet carries out the modulation and demodulation on the IVR side. The modulation frequency is in the range of 300 Hz to 3 kHz being compatible with the telephone network.

When off-hook, the telephone line provides through the rectifier bridge B1 approximately a +10V DC voltage. The Zener diode Z1 regulates the DC voltage between +3V and +5V to power (Vcc) the card and the resistor R3 limits the current drained from the telephone line. The capacitor C1 isolates the I/O terminal from the DC voltage and the resistor bridge R1/R2 realizes a current/voltage conversion between the telephone line and the device. The R4 pull down resistor automatically activates the modem interface.

In a third embodiment, the modulated data is transmitted to and received from a PC or an IVR server via an acoustic coupler, as detailed in FIG. 5. A microphone and speakers are plugged into the sound card, and respectively a telephone handset is plugged into the telephone line.

The +3V battery cell B1 powers (Vcc) the card and the R1 pull down resistor automatically activates the modem interface. The speaker/microphone transducer T1 converts the modulated signal into an audible sound and vice versa.

The secure memory device remains compliant with the ISO 7816 standards and can be used in the existing card readers. The device is connected to the ISO contacts as followed (nc: not connected):

```
C1 = Vcc
C2 = Rst
C3 = Clk
C4 = nc
C5 = Gnd
C6 = nc
C7 = I/O
C8 = nc
```

The invention claimed is:

1. A dual-purpose smart card:

a standard ISO 7816 eight-pad array including a reset (Rst) pad and an I/O pad;

digital storage media and first electronic circuitry compliant with ISO 7816 standards and connected to the pad interface, enabling the card apparatus to be used as a conventional smart card;

an oscillator connected through a one-wire modem to the I/O pad, enabled to provide a modulated voltage on the I/O pad; and control circuitry enabled to control functions of the first electronic circuitry and the one-wire modem;

wherein, with the Rst pad high the one-wire modem is inactive and the first electronic circuitry is active enabling the smart card to function as a standard smart card through the ISO 7816 interface with a conventional card reader, and with the Rst pad low, the first electronic circuitry is disabled, and the one-wire modem is enabled, providing a modulated voltage signal on the I/O pad.

* * * * *